Nov. 23, 1965  J. C. SIMONS ETAL  3,218,965
PRESSURE CONTROL MEANS FOR PRINT HAMMERS
Filed April 20, 1965  5 Sheets-Sheet 1
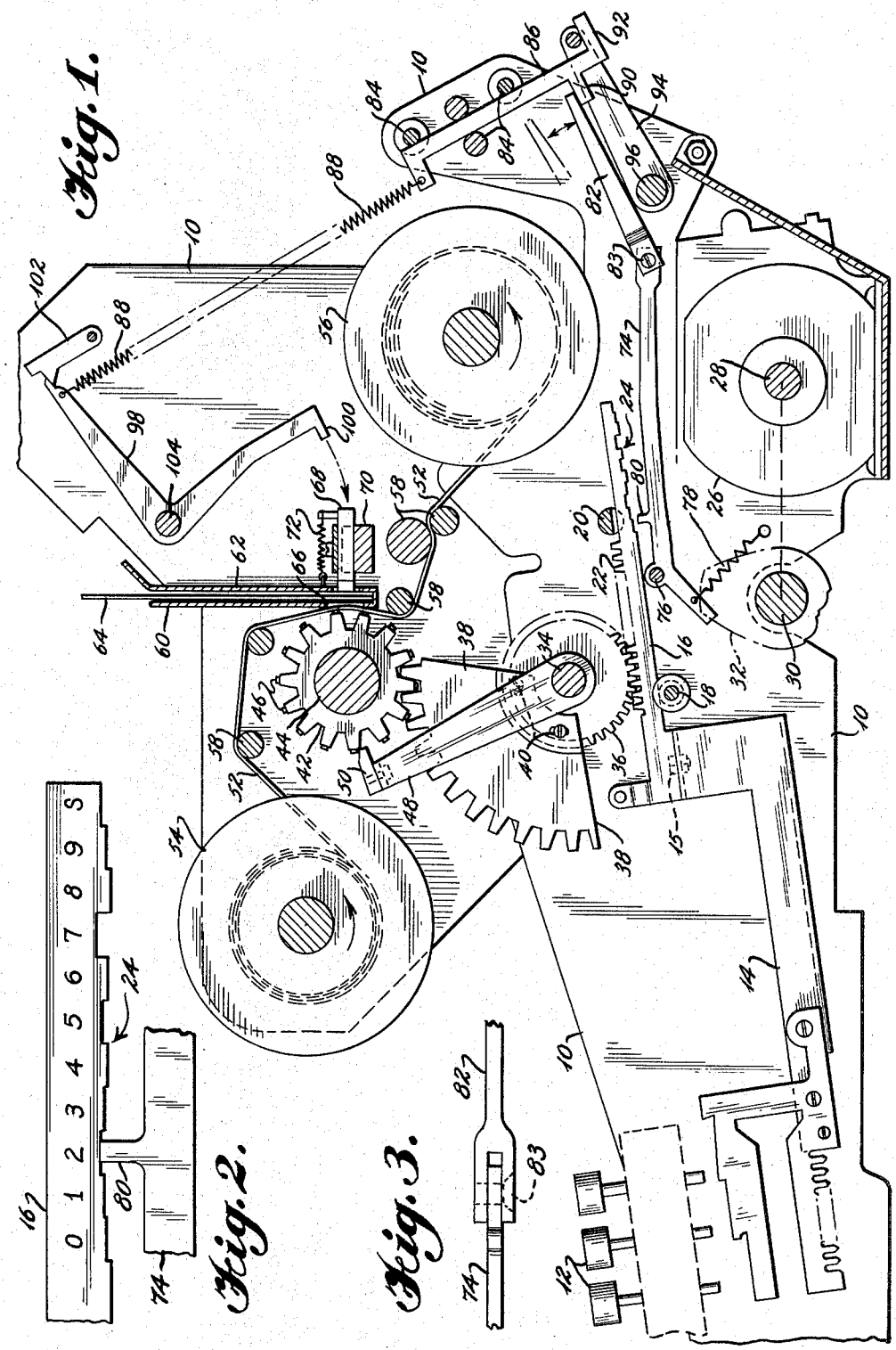

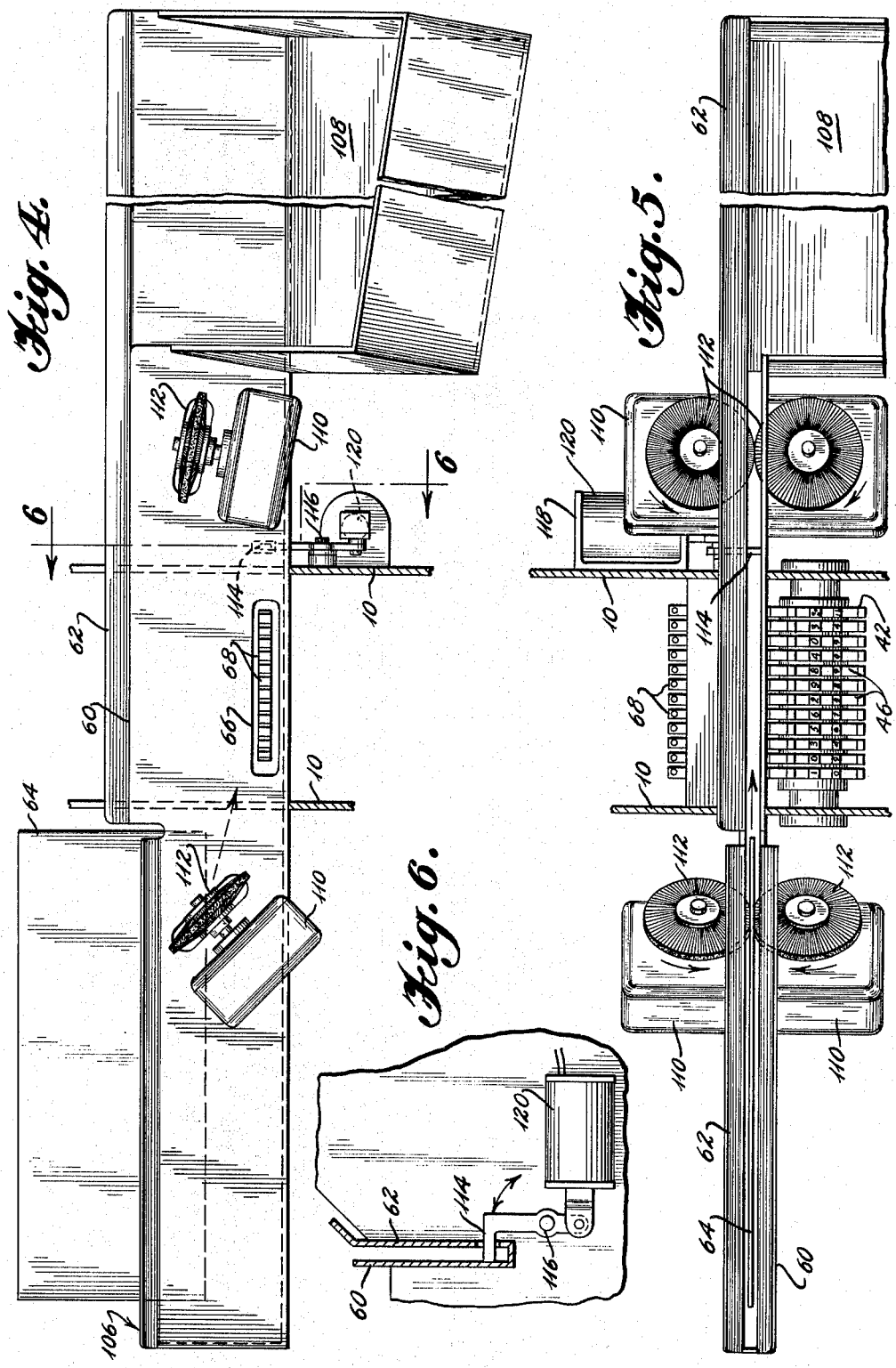

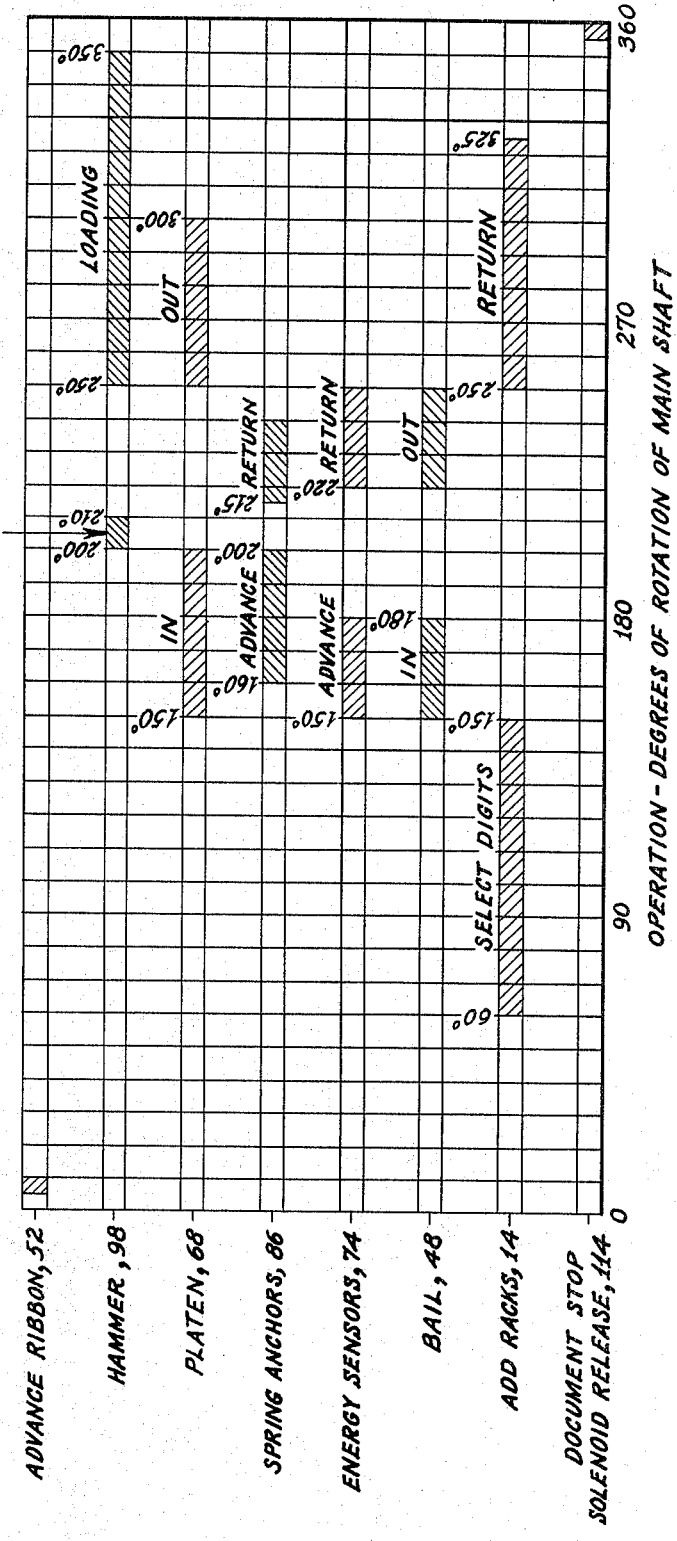

Nov. 23, 1965    J. C. SIMONS ETAL    3,218,965
PRESSURE CONTROL MEANS FOR PRINT HAMMERS
Filed April 20, 1965    5 Sheets-Sheet 5
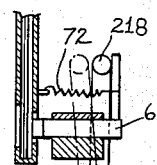
*Fig. 11*
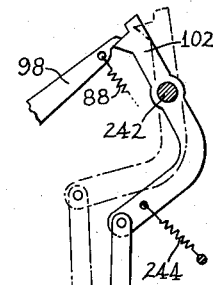
*Fig. 12*
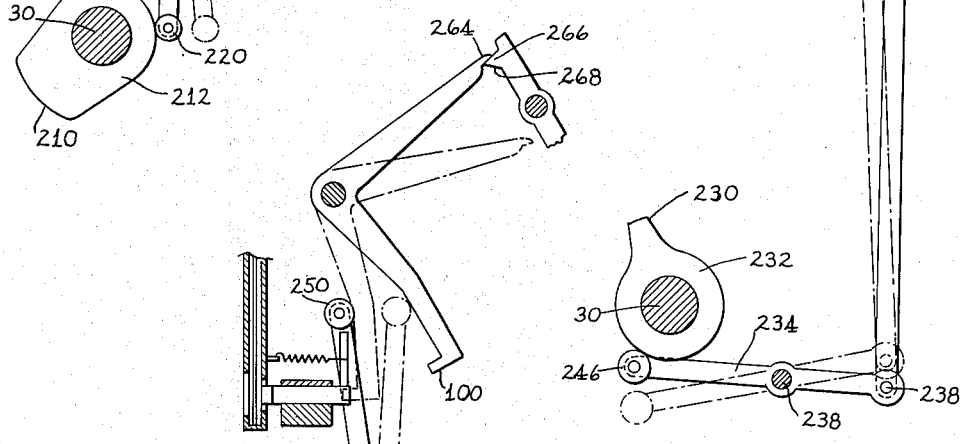
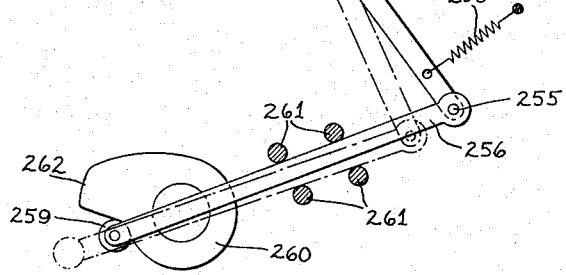
*Fig. 13*

United States Patent Office 3,218,965
Patented Nov. 23, 1965

3,218,965
PRESSURE CONTROL MEANS FOR
PRINT HAMMERS
Jack C. Simons, Churchville, Pa., and Andrew V. Crossley, Euless, Tex., assignors to Sperry Rand Corporation, New York, N.Y., a corporation of Delaware
Filed Apr. 20, 1965, Ser. No. 452,445
4 Claims. (Cl. 101—93)

This application is a continuation-in-part of applicants' co-pending patent application Serial No. 281,661, filed May 20, 1963, now abandoned.

This invention relates to printing means and more specifically to a printer capable of delivering a variable energy to the printing hammers of the device for encoding documents.

In the high speed processing of business documents, such as bank checks and deposit slips, a high speed document sorter may be utilized to read a magnetically encoded group of symbols positioned upon the face of the document. The characters (digits and symbols) are interpreted by electronic means and additional means are employed to determine the sorting routine of the document. Another means by which an encoded document may be read and interpreted, is by an optical character reader. For example, gasoline station credit cards may be encoded and read by optical or other reading devices.

If the reject rate, i.e., those documents which cannot be sorted due to improper positioning or quality of the code, is to be minimized, the source documents must be encoded in such a manner that all of the symbols and digits can be read and interpreted by the sorting device. If characters are improperly positioned, are too lightly imprinted, are too heavily imprinted, or contain voids and smears, then the document may not be read by the automatic means and must be placed in a reject hopper to be dealt with manually, thus, tending to defeat the goal of truly high speed operation.

The early prior art devices to perform the encoding of the characters on the documents took the form of modified adding machines. These devices would only operate satisfactorily for a short time and as soon as any wearing of the parts took place, misregistration and poor quality of imprinting was encountered. In addition, these early machines made no provision for varying the energy exerted by the platens to cause the imprinting for the various characters according to the surface area of the character.

A further development of the adding machine comprised means to sense the character to be imprinted to thereby vary the energy exerted by the printing hammers on the platens. One such known device utilized a cylinder or gear having a plurality of pins spaced a distance from the periphery of the cylinder according to the surface area of the character to be printed. The cylinder is positioned accordingly as the print wheel is moved to its differential position. This device is cumbersome, expensive, difficult to maintain and synchronize, and subject to difficulty, and particularly, when it is desirable to change the type font.

A code known as the E13B has been adopted for use in the banking industry for magnetically encoding bank documents such as checks, deposit slips, etc. Other codes are applicable in the field of optical character reading. In the E13B font, the heaviest character (the character having the largest surface area) is the "8" while the character having the smallest surface area is the "7." The order of surface area of the characters from the largest to the smallest is 8, 9, 6, 0, 4, 1, 3, 5, 2, and 7. Because of the physical characteristics of these various character types, it has been found that the energy exerted by the printing hammer against the platens will be sufficient for printing certain of the characters but will be insufficient for printing others of the characters. If the actuating means is set to print the heaviest characters properly, then the smaller surface area characters will be too heavy and vice versa. If the force actuating mechanism is adjusted so that the characters in the middle of the scales such as the 0, 4, 1, and 3 are properly imprinted, then the 8, 9, and 6 will be too light while the 5, 2, and 7 will be too heavy. Since the actuating energy to adequately print from the characters having a large surface area will be too great for the types having small surface areas, the result will be that such small area types will be driven through the record material. Conversely, the hammer energy which is sufficient to print the smaller area characters will be insufficient to obtain an impression for the larger area types sufficient for the reading device to properly read and interpret the character.

As a result, it becomes desirable to provide a means for actuating the hammers and platens according to the surface area of the character and, more specifically, for utilizing a device which is simple and reliable in operation and will provide a variable energy to the printing hammer according to the surface area of the character. In addition, it is desirable that existing devices, such as the well known adding machine, may be easily modified to perform the variable energy required in the printing operation and, thus, reduce the cost of a printer or encoder of this type by alleviating the necessity of a specialized device for performing the coding operation.

Accordingly, it is the principal object of this invention to improve printers.

It is a further object of this invention to improve printers of the type for encoding bank documents, credit invoices, etc.

It is a further object of the present invention to provide a means for controlling the energy imparted to the printing hammer of a printing device.

It is a still further object of the present invention to provide a variable energy printing device which energy is dependent upon the configuration of the character to be imprinted.

It is a still further object of the present invention to provide a plurality of printing hammers each capable of delivering a different energy to a printing platen according to the configuration of the character to be imprinted.

It is a still further object of the present invention to provide a means readily adaptable for connection to the add rack of an adding machine and which is capable of determining the character to be imprinted and providing for a variable energy by the printing hammer according to the configuration of the character to be printed.

Briefly, the document to be encoded is placed in the document tray and means are employed to advance the document to the imprinting station. When the document reaches the imprinting station, it engages a stop arm positioned in the document path so that it remains in the desired location. The keys of the imprinting device are then depressed and actuation of the motor bar positions the add racks a differential distance according to the characters to be imprinted. Connected to and extending from one end of each add rack is a character area arm whose underside is notched or indented according to the surface area of the character to be imprinted. In the case of the digit "8," little or no indention is made in the character area arm for the E13B font. For the case of the digit "7," the largest indention is made in the character area arm. The intermediate characters have indentions between that for the digit "8" and the digit "7" and corresponding to the surface area of the character to be imprinted.

After the character area arm is positioned, an energy sensor is actuated to sense which character is to be imprinted by that particular add rack or in that particular order position. The energy sensor contains a projection at one of its ends to sense the indentions in the underside of the character area arm and an extension at its opposite end, which is positioned according to the indention in the character area arm, for positioning the actuators for the printing hammers. After the energy sensors are positioned, a crank spring anchor is released which permits the positioning of the spring anchors according to the position of the energy sensors. The spring anchors are directly coupled to the springs which provide the driving energy for the print hammers. In the case of imprinting characters having a large surface area, the spring anchors will remain downwardly which provides a greater energy to the print hammers than if the spring anchors are permitted to move upwardly and, thus, "release" the spring somewhat.

After the spring anchors are positioned, a hammer release crank will release the hammers which strike the platens and cause the document to be driven against the print wheel. Thus, the characters will be imprinted upon the document by an energy directly proportional to the surface area of the character. The document stop solenoid release is then actuated and the document advances to the output hopper. The ribbon advance mechanism is actuated and the encoder is now ready to receive another document for printing.

Further features and objects of the invention will be found throughout the more detailed description and a better understanding of the invention will be afforded by the following detailed description considered in conjunction with the accompanying drawings, in which:

FIGURE 1 is a side elevation of the imprinter or encoder of the present invention;

FIGURE 2 is an enlarged view of a portion of the character area arm and the energy sensor;

FIGURE 3 is a top view showing adjusting means of the energy sensor;

FIGURE 4 is a front elevation view showing the document transport means, the document stop means, and the document output hopper;

FIGURE 5 is a plan view of the elements of FIGURE 4;

FIGURE 6 is a sectional view taken along the lines 6—6 of FIGURE 4 showing the document stop arm and solenoid;

FIGURE 7 is a timing diagram of the printer or encoder of the present invention;

FIGURE 11 is a fragmentary view showing the cam operation of the platen;

FIGURE 12 is a fragmentary view showing the cam operation of the hammer release crank; and FIGURE 13 is a fragmentary view showing the cam operation of the hammer restoring bail.

Figure 8:
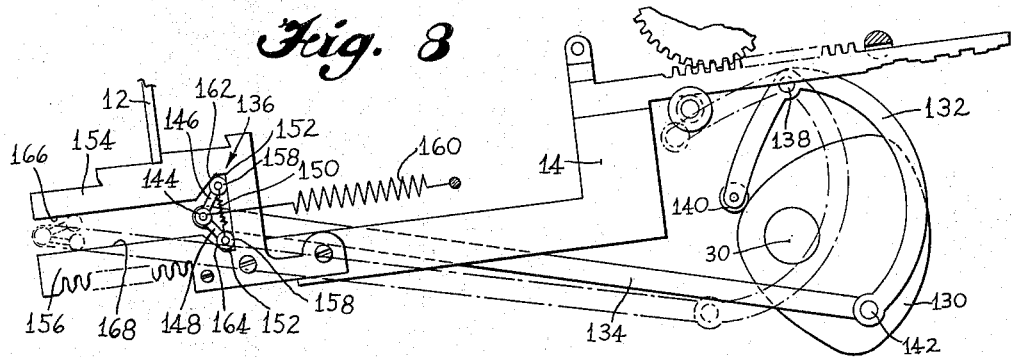
FIGURE 8 is a fragmentary view showing the cam operation of the add racks.

As shown in the FIGURE 1, the elements of the invention are supported generally by a frame as indicated by the designation 10. It will be understood, that various supporting means, cams, anchors, driving means, bearings, etc. which are well known in the art, are not shown in the FIGURE 1 so that the side elevation is disclosed without the showing of the incidental elements, so that the invention will not be obscured by various nuts, bolts, restraining means, etc. As the keys 12 are depressed, and a motor bar (not shown) actuated, an add rack 14 will be driven leftwardly a differential distance according to the character to be imprinted. It will be understood that there are as many add racks, etc., as there are orders to be imprinted. If the digit "0" is to be imprinted, then the rack 14 is not driven or driven only a short distance and if the digit "9" or a symbol digit "S" are to be imprinted, then the rack 14 is driven leftwardly a greater distance. The positioning of add racks is well known in the art and will not be described in detail here, but is described later in connection with FIGURE 8.

Connected to, or in other embodiments made an integral part thereof, is a character area arm 16. Since the character area arm 16 is connected to the rack 14, it will likewise be positioned a differential amount according to the character to be printed. It will be understood that there are as many racks, character area arms, etc. as there are orders to be imprinted.

The character area arm 16 of FIGURE 1 is supported by any suitable means, such as the supports 18 and 20. As shown, the character area arm 16 has teeth 22 formed on its upper edge and a series of notches 24 formed at one end thereof along its lower edge, see FIGURE 2, and will be discussed subsequently.

The main source of motive power for the encoder of the present invention is an electric motor 26. It will be understood that other suitable means may be utilized to provide power to the device such as a hand crank. The output from the motor 26 is coupled from its shaft 28 to a main cam shaft 30. Mounted upon the main cam shaft 30 are a plurality of cams and extensions therefrom, such as shown at 32. The operation of the various cams and cam followers is well known in the art, however, the pertinent ones and their operation are described later in connection with FIGURES 8 through 13.

Positioned above and to a shaft 34 is a gear 36, the teeth of which engage the teeth 22 of the character area arm 16 to be driven thereby. A gear sector 38 is connected to the gear 36 by the bolts 40. The teeth of the gear sector 38 engage the teeth of a print wheel 42 loosely mounted on shaft 44, and will position the print wheel according to the character to be imprinted. Formed in the gear teeth of the print wheel 42 are the characters 46 of the desired font. Whereas the gear 36 is loosely mounted upon the shaft 34, an aligning bail 48 is rigidly secured to the shaft and is driven forwardly to align the print wheel after the "rough" alignment of the print wheel 42 by the gear sector 38. The extension 50 from the free end of the aligning bail 48 will position itself between the extensions or teeth of the print wheel 42 and provide a means for fine adjustment or alignment of the print wheel 42. The sequence of operations of these devices will be discussed subsequently.

A ribbon 52, shown in the FIGURE 1, is delivered from a supply reel 54 and is advanced to a take-up reel 56 by a series of rollers 58. The rollers 58 position the ribbon 52 between the type 46 of the print wheel 42 and the documents to be imprinted. The ribbon 52 may contain magnetic ink for magnetically encoding documents, or ink for encoding documents for optical character reading, or other suitable inking solutions.

Positioned adjacent to and to the right of the print wheel 42 are the upright members 60 and 62 which form the sides of the document path. A document 64 is shown positioned in the path. At the lower portion of the side 60 of the document path and adjacent the print wheel 42 is an opening 66 (better shown in the FIGURE 4) which permits engagement of the document 64 with the print wheel 42. Immediately across from opening 66 and located in the side 62 of the document path is another opening which permits the platens 68 to extend into and against the document and force the document 64 against the type 46 of the print wheel 42 at the appropriate time. The platens 68, also known as the hammer slugs, are supported by any suitable means such as those shown at 70 and are urged toward the print wheel 42 by the resilient means 72. A means, shown in FIGURE 11, and described later, retains the platens 68 in the position shown (out of the document path) until the appropriate time that printing is desired, at which time the platens 68 are released and are urged inwardly by the resilient means 72.

An energy sensor 74 is positioned below each character area arm 16. The energy sensor 74 pivots about the point 76 and is biased upwardly by the resilient means 78 which is connected to the energy sensor and the frame 10 for example. Each energy sensor has a projection 80 which is adapted to sense the notches 24 formed in the lower portion of the character area arm 16 when the sensor moves upwardly. The notch sensed will be that one corresponding to the character to be printed. The far right end of the energy sensor 74 has an extension 82 adjustably secured thereto by a screw or bolt 83, and engaging a spring anchor 86 directly coupled to the hammer spring 88. The energy sensor 74 with its extension 82 is shown in its normal position and at the appropriate time, is moved counterclockwise as far as the projection 80 and one of the notches 24 will permit. An alternate construction may eliminate the joint formed at the screw 83, thus, making the sensor 74 of unitary construction.

At the far right of the machine, as seen in FIGURE 1, the frame 10 supports a plurality of guides 84 which position a plurality of the spring anchors 86, one for each sensor 74. The upper end of the spring anchor is fashioned to receive one end of the hammer spring 88 while its opposite end has a projection 90 extending substantially perpendicular from its main body for engaging the extreme right end of the extension 82 of the energy sensor 74. A second projection 92 extends in a direction opposite to that of the projection 90 and provides a means for holding the spring anchors in a downward position by engagement with a crank spring anchor 94 pivotally mounted on the shaft 96, and shown in its normal retracted position. At the appropriate time, the crank spring anchor 94 is released and pivots about its shaft 96 in a counterclockwise manner, thus permitting the spring anchor 86 to move upwardly until the projection 90 engages the extension 82 of the sensor 74.

A hammer 98, which may be constructed in any desired configuration such as in the form of a "V" has an extension 100 from one of its ends which is adapted to engage and strike a platen 68. The opposite end of the hammer is notched to engage one end of a hammer release crank 102 which retains the hammer in its non-printing or retracted position. At the appropriate time in the machine cycle, the hammer release crank 102 is driven clockwise to permit the hammer 98 to be pivoted clockwise about its pivot 104 by its spring 88. This causes the projection 100 of each hammer to abruptly engage a platen 68, thus forcing the document 64 against the type 46 of the type wheel 42 to make an impression on the document 64. Each of the hammers 98, only one of which is shown, will be driven clockwise by energy proportional to the distance that the hammer spring 88 is extended. It will be understood that the distance that the hammer spring 88 is extended will be controlled by one of the notches 24 which is dependent upon the area of the character to be imprinted.

As shown in the FIGURE 2, the character area arm 16 has its lower edge 24 notched and the character corresponding to the particular notch is shown above the respective notch. It will be understood that the depth of the notches shown are for the E13B font, and that other fonts, having characters of different surface area, will require notches of different depths. If other fonts are to be imprinted, it will be understood that the securing means 15, which couples the add rack 14 to the character area arm 16, may be disengaged and a new character area arm 16 having the desired configuration secured to the add rack 14.

In the FIGURE 2, the energy sensor 74 is shown in engagement with the notch corresponding to the character "2" which is one of the lighter characters in the E13B font, only the digit "7" having a smaller surface area. Accordingly, the notch or slot for the digit "7" is the deepest, the notch for the digit "2," the next deepest, and so forth up to the character "8" where there is no notch (none of the lower area of the character area arm 16 is removed). A second embodiment (not shown) of the character area arm contemplated is to substitute for the notches. A continuous curve so that the sensed portions of the curve would correspond with the depth of the notches. It should be necessary in this embodiment, then, to round off the sensing end of the projection 80.

The document transport means is shown in the FIGURES 4 and 5. In the elevation view of FIGURE 4 and the top plan view of FIGURE 5, the sides or upright portions 60 and 62 form the document path. The supports 60 and 62 are positioned upon portions of the machine frame 10. The document transport path comprises generally the area 106 which is formed to receive a single document that may be inserted manually. At the opposite end, of the upright supports 60 and 62, from the input station 106, is an output hopper 108. Positioned along the document path and juxtaposed to the input station 106 are a pair of motors 110, which are supported by any suitable means to the sides 60 and 62 of the document path, and which are connected to and drive contrarotating brushes 112. The brushes 112 lightly engage the documents 64 and by their rotation advance them to the imprinting station located directly in front of the platens 68. It will be noted that the input station 106 has the upper edge of the sides 60 and 62 beveled away from the vertical so as to permit easy insertion of the document 64.

A similar pair of motors 110 and brushes 112 advance the documents to the output hopper 108. As a document is dropped into the input station 106, the brushes 112 will advance the document 64 to the imprinting station where it is stopped by the stop arm 114 (best shown in the FIGURE 6) which is positioned within the document path formed by the members 60 and 62. The stop arm 114 pivots about a point 116 and is suitably supported by a means 118, as shown in the FIGURE 5. Connected to the opposite end of the stop arm 114 is a solenoid 120 which when actuated, will cause the stop arm 114 to be positioned within the document path and inhibit the advancement of the documents. When the solenoid 120 is deactivated, the stop arm 114 rotates clockwise about its pivot point 116 which results in its being withdrawn from the document path. The set of brushes in the input station 106 will now advance the document 64 to the second set of brushes 112 positioned adjacent the output hopper. A suitable key, now shown, may be positioned upon the keyboard to actuate the solenoid 120 and the stop arm 114. If the pivot point 116 is positioned below the plunger of the solenoid 120, then actuation of the solenoid will withdraw the stop arm 114 from the document path.

In understanding the operation of the device, reference will be had to FIGURE 7 in addition to the other figures.

As shown in FIGURES 4 and 5, a document 64 is dropped between the sides 60 and 62 forming the document path, at the input station 106. The brushes 112 advance the document to the print station and the motion of the document is inhibited by the stop arm 114. The keys 12, shown in the FIGURE 3, are depressed according to the desired code or amount which it is desired to imprint upon the document 64. A motor bar (not shown) is now actuated which causes the motor 26 to impart motion to its shaft 28, which drives the main cam shaft 30.

With reference now to FIGURE 8 it is seen that movement of the add racks to their advanced character selecting position and return is effected by a mechanism including a cam 130 (on shaft 30) through the crank 132, linkage 134 and collapsible toggle 136. The crank 132 is pivoted at 138 to the frame 10 and has a cam follower 140 on one end. Its other end 142 is pivotally connected to one end of link 134 which has its other end pivotally connected to the knuckle 144 of toggle 136. The arms 146 and 148 of the toggle are also pivoted together at 145 with their ends biased apart by a compression spring 150 to terminate in recesses 152 in add rack extensions 154 and 156. Roller 158 may be provided on the end of arms 146 and 148 for ease of operation.

The whole mechanism is biased to the right or retracted position by a tension spring 160, one end of which is connected to knuckle 145 of the toggle and its other end to the frame 10, thus to urge the cam follower 140 against cam 130. Rotation of the cam urges the cam follower from its retracted position, shown in full lines, to the broken line position wherein the crank has moved the link and toggle to their extended position, shown in phantom. If the add rack movement is stopped by a depressed key 12 before completion of the toggle movement, the toggle arms collapse or fold toward each other as urged by the angled surfaces 162 and 164 of add rack extension 154 and 156. Continued movement would be as guided by and between the facing edges 166 and 168 of the extensions.

Figure 9:
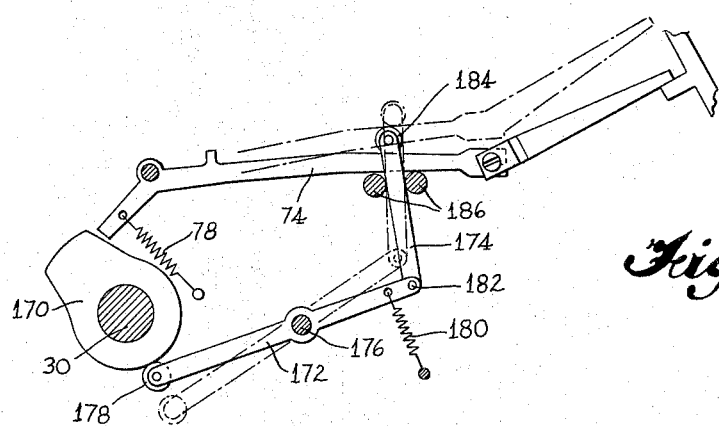
FIGURE 9 is a fragmentary view showing the cam operation of the add rack sensor.

As seen in FIGURE 9 the movement of the sensor 74 is controlled by a cam 170 (on shaft 30) through the crank 172 and link 174. The crank is pivotally mounted to the frame 10 at 176 and has a cam follower 178 at one end urged into contact with the cam by a tension spring 180. One end of the spring is connected to the free end of the crank and its other end to the frame. Link 174 has one end pivotally connected to the free end of the crank at 182. Its other end is provided with a bail 184 extending over the upper edge of sensor 74. A pair of guides 186 serve to control the movement of link 174 as now to be described.

At the proper time in the operative cycle, cam 170 moves cam follower 178 from its retracted position shown in full lines, to its advanced position, shown in phantom, the crank 172 rotates counterclockwise to move link 174 upwardly thus permitting spring 78 to rotate sensor 74 upwardly to sense the particular notch positioned over finger 80. Continued rotation of the cam permits spring 180—which is stronger than spring 78—to return the crank 172, the link 174 and consequently sensor 74 to their retracted positions.

Figure 10:
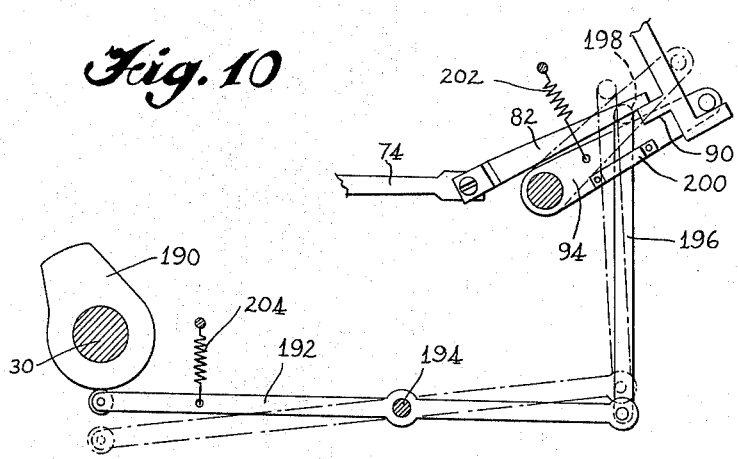
FIGURE 10 is a fragmentary view showing the cam operation of the spring anchor bail.

It will be seen in FIGURE 10 that operation of the spring anchor crank 94 is substantially similar to the operation of add racks 14 and the sensor 74. As the cam 190 rotates, it moves the crank 192 counterclockwise about its pivot 194. The consequent upward movement of the free end of the crank moves link 196 and its bail rod 198 upwardly guided by strap 200, thus releasing spring anchor crank 94 to move upwardly, as by spring 202, until its projection 90 contacts extension 82 of senor 74. When the cam follower rides to the low side of cam 190, as urged by spring 204, which is stronger than spring 202, bail rod 198 returns crank 94 to its retracted position.

Similarly as illustrated in FIGURE 11, platen 68 is released for movement against the printing medium 64 as by spring 72. The high lobe 210 of cam 212 rotates crank 214 counterclockwise about its pivot 216 moving its bail carrying free end 218 to the left out of the path of platen movement. Return of the cam follower 220 to the low side of the cam permits spring 222, which is stronger than spring 72, to rotate crank 214 clockwise returning the platen to its retracted position.

It is seen in FIGURE 12 that the high lobe 230 of cam 232 will rotate crank 234 counterclockwise about its pivot 236. The consequent upward movement of its free end 238 moves link 240 upwardly to rotate the hammer release crank 102 clockwise about its pivot 242 thus to release the hammer 98 for its printing stroke by spring 88. Return of the mechanism to its original position is by spring 244, as cam follower 246 returns to the low side of the cam.

After the hammer has effected a printing stroke, as seen in phantom in FIGURE 13, it is returned to its cocked retracted position by the bail 250. A crank 252 pivoted at 254 on frame 10 carries the bail on its upper free end and has its lower end pivotally connected at 255 to one end of a rod 256. A tension spring 258 urges the crank to the right drawing the rod in that direction and holding the cam follower 259 on the opposite end of the rod against the cam 260. Movement of the rod is through restraining rods 261. At the proper time in the operative cycles, as described later, the high lobe 262 of the cam urges the rod to the left to rotate crank 252 clockwise causing bail 250 to rotate the hammer 98 counterclockwise until its outer end 264 moves over the tip 266 of hammer release crank 102. The upper surface of end 264 cooperates with the lower surface 268 of tip 266 to cam the hammer release crank 102 clockwise during this return movement of the hammer. The spring 244 (FIGURE 12) snaps the tip back under end 264 when the hammer end is over it.

Reference to FIGURE 7 will show the following sequence of operations. As the shaft 30 rotates, the first operation is the advancement of the ribbon 52 by a slight counterclockwise rotation of the take-up reel 56. This may be accomplished by a simple ratchet and pawl mechanism of well known construction but which has not been shown as it is unimportant to a complete understanding of the present invention. The next operation is the withdrawal of the crank hammer loading bail 250 (FIGURE 13) which loaded the hammer 98 on its previous cycle. The crank hammer loading means must be withdrawn so that on the present cycle, when the hammer 98 is actuated to cause an impression upon the document, it will not strike the loading means.

At approximately 60 degrees, as indicated in FIGURE 7, the add racks 14, carrying the character area arm 16, are driven leftwardly to position each add rack 14 according to the character to be imprinted by that add rack. The motion of the add rack 14 continues through the character area arm 16, the gear 36, the gear sector 38, and finally positions the print wheel 42. The positioning of the print wheel 42 is accomplished by approximately 150 degrees.

At 150 degrees, three operations commence to take place: the platens 68 are released by bail 218 (FIGURE 11) and the springs 72 urge the platens 68 against the document 64 and the type 46 on the print wheel 42; the energy sensors 74 are released by bail 184 (FIGURE 9) and rotate counterclockwise about the shaft 76 which causes the projections 80 on the energy sensors 74 to engage one of the notches positioned on the lower edge of the character area arm 16; and, the aligning bail 48 is driven clockwise by a means not shown to precisely align the print wheel 42 by an engagement of the extension 50 with the areas between the teeth of the print wheel 42.

At 160 degrees rotation of the main shaft, the spring anchors 86 are permitted to move upwardly due to the rotation of the crank spring anchor 94 (see FIGURE 10) in a counterclockwise manner about its pivot point or shaft 96. The projections 90 of the spring anchors 86 now rest against the lower side of the extension 82 of the energy sensors 74.

At 180 degrees, the energy sensors 74 and the aligning bail 48 have reached the end of their travel and remain in this position for approximately 40 degrees of rotation.

At 200 degrees, the platens 68 will be firmly positioned against the document and the type 46 of the print wheel 42 and, in addition, the spring anchors 86 will have reached the end of their travel as permitted by the extension 82 of the energy sensors 74.

With the spring anchors 86 thus positioned, the hammer springs 88 may be said to possess potential energy proportional to the surface area of the character to be imprinted by its associated print wheel 42.

Also at 200 degrees, the hammer release cranks 102 commence their clockwise rotation about their pivot point 242 (FIGURE 12) to release the hammers. This motion continues until approximately 210 degrees. At approximately 205 degrees, the hammers 98 are released by their associated hammer release crank, causing the hammers 98 to pivot clockwise about their shaft 104 and cause the projection 100 on the hammer 98 to strike the platen 68, thus driving the platen against the document and the type 46 on the face of the print wheel 42. The characters have now been imprinted upon the document 64.

From 215 degrees to 240 degrees, the spring anchors 86 are returned to their normal position by actuation of the crank spring anchor 94 in a clockwise manner about its shaft 96 (FIGURE 10). The extension 92 from the spring anchors 86 will engage the pin located at the end of the crank spring anchor 94 and will be driven downwardly to its neutral position. From 220 degrees to 250 degrees, the energy sensors 74 and the aligning bail 48 are returned to their normal positions as shown in FIGURE 9.

At 250 degrees rotation of the main cam shaft, three operations commence to take place; the hammers 98 are withdrawn by counterclockwise rotation about the shaft 104 (FIGURE 13), thus positioning the end of each hammer 98 under the hammer release crank 102, which operation is completed by 350 degrees; the platens 68 are driven rearwardly by bail 218 (FIGURE 11) which operation is completed by approximately 300 degrees; and, the add racks 14 are returned to their normal position (FIGURE 8) which operation is accomplished by approximately 325 degrees.

The final operation is the release of the document stop arm 114 by deactivation of the solenoid 120, best shown in the FIGURE 6. The document 64 will then be advanced by the brushes 112 to the output hopper 108. The encoder of the present invention is now ready for subsequent encoding operations.

Thus, there has been described a variable energy printing mechanism which is capable of imparting energy to a print hammer which is in relation to the area of the character. Means are employed to sense an extension to the add rack, which means then directly control the potential energy supplied to a plurality of springs, coupled respectively, to a plurality of hammers, one hammer per spring.

It will be understood that the present invention may be embodied in other specific forms without departing from the spirit and essential characteristics of the invention. The present embodiment is, therefore, to be considered in all respects as illustrative and the scope of the invention being indicated by the appended claims rather than by the foregoing description, and all changes which come with in the meaning and range of the equivalency of the claims are therefore intended to be embraced therein.

The embodiments of the invention in which an exclusive property or privilege is claimed are defined as follows:

1. In a printing mechanism;
(A) means carrying a font of type characters of varying surface area;
(B) means mounting said font carrying means whereby individual ones of said font characters may selectively be moved into position for printing;
(C) operable key elements, one for each font character;
(D) elongated rack means movable to positions determined by actuation of one of said key elements;
(E) means interconnecting said rack means and said font carrying means whereby movement of said rack means to a key determined position effects movement of said font carrying means to present the font character corresponding to an actuated key element into printing position;
(F) platen means positioned to be driven against said font carrying means to print the said presented font character on a printable medium positioned between said platen and said font carrying means;
(G) hammer means positioned for driving said platen means;
(H) spring means for driving said hammer means;
(I) means connecting one end of said spring to said hammer means;
(J) movable means anchoring the other end of said spring; and
(K) means for adjusting the spring force with which the hammer means drives said platen means, said adjustment being in accordance with the surface area of the font character to be printed;
(L) said adjusting means comprising,
(a) notches aligned along said rack means and differentially spaced in accordance with the different surface areas of said font characters, and
(b) sensing means positioned to move against the notch corresponding to the font character positioned in printing position by said rack means,
(c) said sensing means having means movable simultaneous with its sensing movement to stop the movement of said anchor means and adjust said spring force in accordance with the amount of movement of said sensing means to a particular notch on said rack means whereby in effect the force of said spring is adjusted an amount corresponding to the relative area of the font character in printing position.

2. In a printing mechanism;
(A) means carrying a font of type characters of different surface areas;
(B) means mounting said font carrying means whereby individual ones of said font characters may selectively be moved into position for printing;
(C) manually operable key elements, one for each font character;
(D) elongated rack means movable to positions determined by actuation of one of said key elements;
(E) means interconnecting said rack means and said font carrying means whereby movement of said rack means to a key determined position effects movement of said font carrying means to present the font character corresponding to an actuated key element into printing position;
(F) platen means positioned to be driven against said font carrying means to print the said presented font character on a printable medium positioned between said platen and said font carrying means;
(G) hammer means positioned for driving said platen means,
(a) said hammer means being movable between a retracted cocked and an advanced printing position, and
(b) detent means for releasably holding said hammer in its retracted position until printing is called for;
(H) spring means for driving said hammer means to its advanced printing position;
(I) means connecting one end of said spring to said hammer means;
(J) movable means anchoring the other end of said spring;
(K) means for adjusting the spring force with which the hammer means drives said platen means, said adjustment being in accordance with the surface area of the font character to be printed;
(L) said adjusting means comprising;
(a) notches aligned along said rack means and differentially spaced in accordance with the different surface areas of said font characters, (b) sensing means positioned to move against the notch corresponding to the font character positioned in printing position by said rack means,
(c) means for so moving said sensing means, and
(d) means on said sensing means and movable in the path of movement of said spring anchor means whereby movement of said sensing means to a notch on said rack permits a corresponding movement of said anchor means thereby to adjust said spring force in accordance with the amount of movement of said sensing means to the particular notch on said rack means whereby in effect the force of said spring is adjusted an amount corresponding to the relative area of said font character.

3. In a printing mechanism:
(A) means carrying a font of type characters of different surface area;
(B) means mounting said font carrying means whereby individual ones of said font characters may selectively be positioned into position for printing;
(C) manually actuatable key elements, one for each font character;
(D) elongated rack means reciprocally movable from retracted at rest to advanced positions determined by an actuated one of said key elements;
(E) means for so moving said rack means;
(F) means interconnecting said rack means and said font carrying means whereby movement of said rack means to a key determined position effects movement of said font carrying means to present the font character corresponding to an actuated key element into printing position;
(G) platen means positioned to be driven against said font carrying means to print the said presented font character on a printable medium positioned between said platen and said font carrying means;
(H) normally retracted hammer means positioned for driving said platen means;
(I) detent means releasably holding said hammer means in said retracted position;
(J) a spring driving said hammer means;
(K) means connecting one end of said spring to said hammer means;
(L) movable means anchoring the other end of said spring;
(M) means for adjusting the spring force with which the hammer means is driven against said platen means, said adjustment being in accordance with the surface area of the font character to be printed;
(N) said adjusting means comprising,
  (a) notches aligned along said rack means and differentially spaced in accordance with the different surface areas of said font characters,
  (b) sensing means positioned to move against the notch corresponding to the font character positioned in printing position by said rack means, and
  (c) means interconnecting said sensing means with said movable spring anchor means whereby movement of said anchor means to adjust said spring force is in accordance with the amount of movement of said sensing means to a particular notch on said rack means whereby the force of said spring is adjusted an amount corresponding to the relative area of said font character;
(O) means for moving said detent means to release said hammer to be driven by said adjusted spring force so to drive said platen against said font character to effect the printing thereof on said printing medium; and
(P) means for returning said hammer to its retracted position.

4. In a printing mechanism:
(A) means carrying a font of type characters of different surface area;
(B) means mounting said font carrying means whereby individual ones of said font characters may selectively be positioned into position for printing;
(C) manually actuatable key elements, one for each font character;
(D) elongated rack means reciprocally movable from retracted at rest to advanced positions determined by an actuated one of said key elements;
(E) means for so moving said rack means;
(F) means interconnecting said rack means and said font carrying means whereby movement of said rack means to a key determined position effects movement of said font carrying means to present the font character corresponding to an actuated key element into printing position;
(G) hammer means to print the said presented font character on a printable medium positioned between said platen and said font carrying means;
(H) detent means releasably holding said hammer means in a retracted position;
(I) a spring for driving said hammer means;
(J) means connecting one end of said spring to said hammer means;
(K) movable means anchoring the other end of said spring;
(L) means for adjusting the spring force with which the hammer is driven, said adjustment being in accordance with the surface area of the font character to be printed;
(M) said adjusting means comprising,
  (a) indentations aligned along said rack means and differentially spaced in accordance with the different surface areas of said font characters,
  (b) sensing means positioned to move against the indentation corresponding to the font character positioned in printing position by said rack means, and
  (c) means interconnecting said sensing means with said movable spring anchor means whereby movement of said anchor means to adjust said spring force is in accordance with the amount of movement of said sensing means to a particular indentation on said rack means whereby the force of said spring is adjusted an amount corresponding to the relative area of said font character;
(N) means for moving said detent means to release said hammer to be driven by said adjusted spring force so to effect the printing of the font character on said printing medium; and
(O) means for returning said hammer to its retracted position.

References Cited by the Examiner

UNITED STATES PATENTS

| | | | |
|---|---|---|---|
| 1,173,321 | 2/1916 | Steiner | 197—17 |
| 1,231,576 | 7/1917 | Duncan | 101—65 |
| 1,243,954 | 10/1917 | Krusius | 197—49 |
| 1,790,790 | 2/1931 | Breitling | 101—93 |
| 2,734,613 | 2/1956 | Kennedy et al. | 197—17 |
| 2,796,966 | 6/1957 | Toeppen | 197—17 |
| 2,935,935 | 5/1960 | Preston | 101—93 |

OTHER REFERENCES

IBM Tech. Disclosure Bulletin, vol. 1, No. 4, page 44, December 1958.

WILLIAM B. PENN, *Primary Examiner.*